Figure 8A:
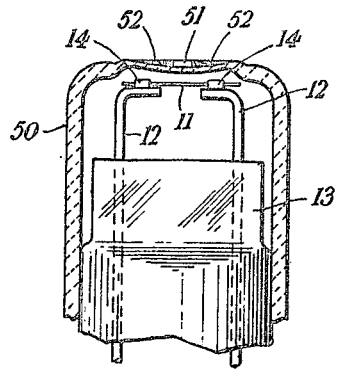

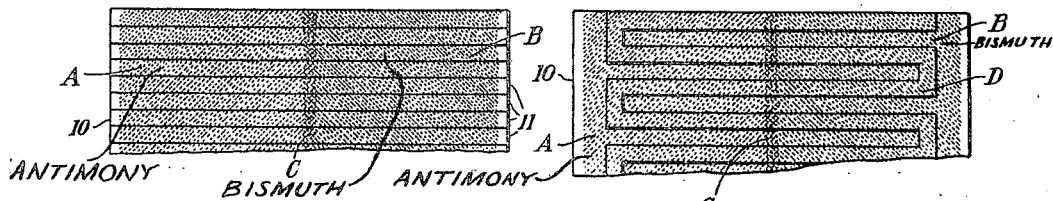
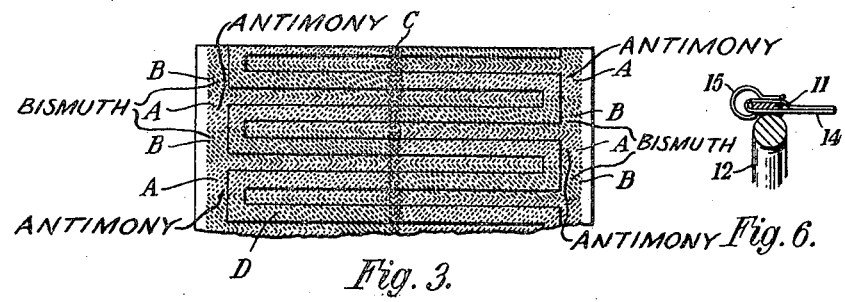
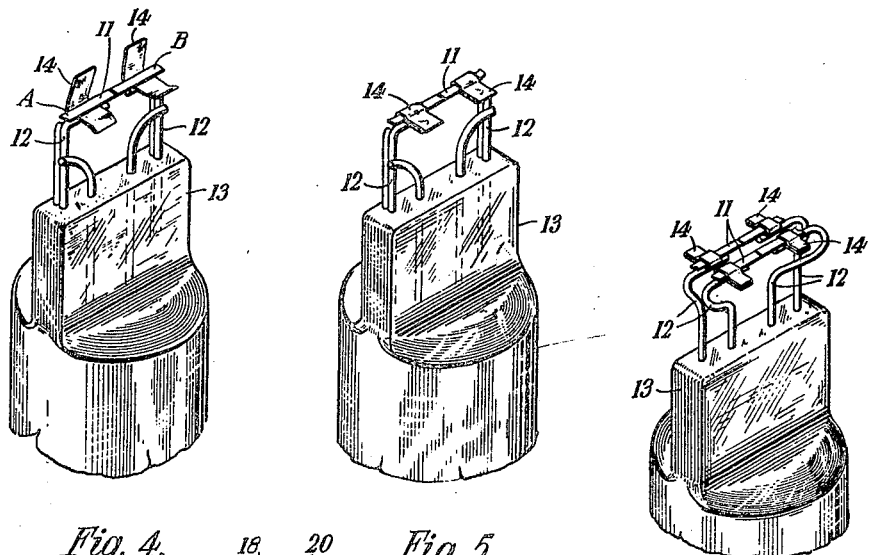
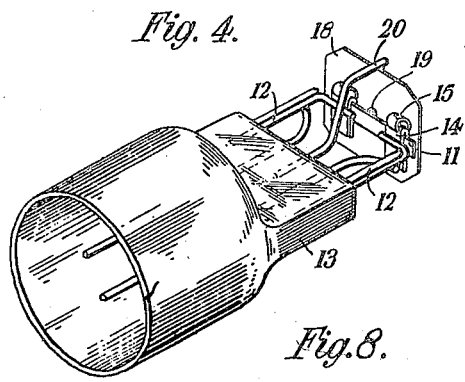

Patented Aug. 7, 1945

2,381,819

UNITED STATES PATENT OFFICE 2,381,819

THERMOCOUPLE

Arnold Graves, Surbiton, and Gilbert Arthur Richard Tomes, West Wickham, England, said Tomes assignor to Alltools, Limited, Brentford, England, a company of Great Britain Application July 13, 1943, Serial No. 494,577
In Great Britain August 19, 1942

4 Claims. (Cl. 136—5)

To obtain a thermocouple of high sensitivity and minimum lag it is best to use, as the elements of the thermocouple, strips which have a thickness measured in microns. Such elements can be produced by deposition, e. g., from solution or by electro-plating, evaporation or sputtering, which allows of fairly accurate control of the thickness of the deposit. In the case of evaporation, the material constituting the element is volatilized in vacuo, while in the case of sputtering the volatilization is carried out under a small pressure of an inert gas.

Thermocouple elements so obtained are of necessity extremely fragile and require some form of supporting surface. If the supporting material is in the form of a plate, then there is random dissipation of heat by conduction in all directions. Also if the thickness of the supporting material is large relatively to the thickness of the deposit of the thermocouple element, then there will be a further loss by directional conduction of heat along this unwanted path to the cold junctions, which also tends to lower the temperature gradient between the hot junction and the cold junctions and so reduce the E. M. F. per degree centigrade of the thermocouple.

Hitherto the methods evolved for the production of thermocouples by deposition have only been suitable for laboratory purposes, and the object of this invention is to enable thermocouples to be made in this way on a mass production basis.

According to the invention overlapping deposits of the two materials constituting the elements of the thermocouple are produced by deposition on a thin supporting sheet of low thermal and electrical conductivity so as to form a narrow substantially rectangular zone of overlap, and the sheet is then cut to form a number of thermocouples. In this way it is possible to form the deposits with some degree of accuracy and so obtain homogeneity.

Thermocouples according to the invention are best utilised in a static vacuum, and in this case are supported on wires mounted on a pinch which is afterwards sealed in a vessel, which is thereafter evacuated. The wires are preferably massive in comparison with the elements of the thermocouple, so that they will assist in keeping the cold junctions cool. In the case of the series zigzag the wires supporting the joints between the constituent strips will have no lead out of the pinch, as no electrical connections are required at these places.

It is preferred to employ, for securing the strips and/or zig-zag to the supporting wires, pressure pads, assisted if necessary by spring clips, which apply pressure to the deposits normally to the length of the strip.

The invention will now be described in further detail, by way of example, with reference to the accompanying drawings, in which—

Figs. 1 to 3 show enlarged views of a sheet after deposition and prior to cutting respectively into single thermocouples, a number of thermocouples connected in parallel and a number of thermocouples connected in series, Figs. 4 and 5 are enlarged perspective views showing successive stages in the connection of the thermocouple to the wires, Fig. 6 is a section, on a still larger scale, showing an alternative form of connection between one end of the thermocouple and a supporting wire, Figs. 7 and 8 are perspective views of further forms of thermocouple according to the invention.

Figures 16, 17:
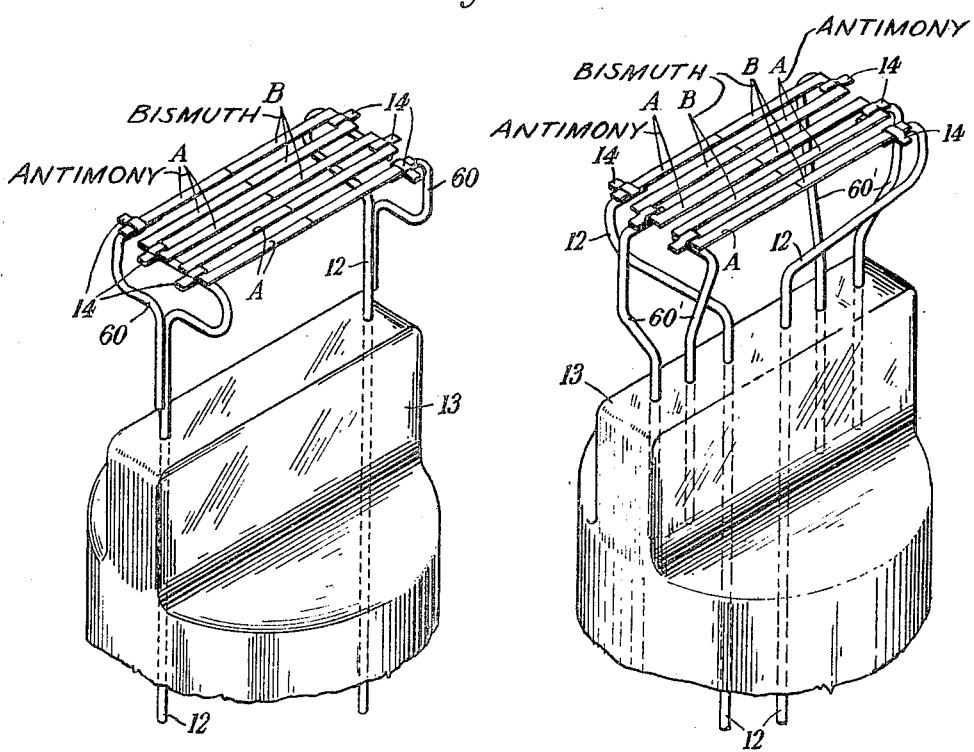
Figure 9:
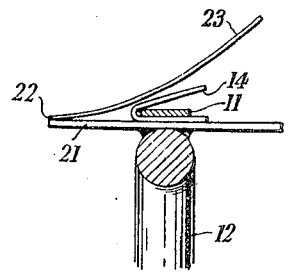
Figure 10:
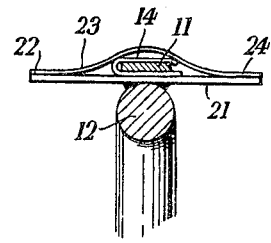

Fig. 8A is a view in elevation of a thermocouple according to the invention enclosed in a glass vessel; the latter being shown in section, Figs. 9 and 10 are enlarged sectional views, similar to Fig. 6, showing a further form of connection between one end of the thermocouple and a supporting wire, Figs. 11–15 are greatly enlarged diagrammatic views showing alternative forms of "overlapping" connection between the deposits which may be produced according to the invention, and Figs. 16 and 17 are perspective views showing respectively the method of supporting the thermocouple formed as indicated in Figs. 2 and 3.

Like reference characters denote like parts throughout the figures.

Referring first of all to Figs. 1 and 2, to produce single thermocouples, or a number connected together in parallel, a thin rectangular sheet 10 of supporting material, such as mica or a porous material, such as thin rice paper, of the kind described in our copending application Serial No. 494,578, may be suspended in a vessel connected to a diffusion pump, such as a mercury vapour pump. In the vessel is located a heater wire coated with antimony and when this is heated by passing an electric current through it the antimony is evaporated and deposited on the mica sheet. A straight edged mask is mounted immediately in front of the sheet, so that the deposit A of antimony is confined to an area consisting of one half of the sheet plus a narrow zone extending just over the centre line of the sheet. Electrical connections are made to the sheet at the edge of the mask and at the exposed edge of the sheet, and by taking resistance measurements between these connections the thickness of the deposit of antimony can be controlled. When the antimony deposit is completed, the vessel is opened, after letting down to air, the mask removed to the other half of the sheet, the electrical connections to the sheet adjusted to conform with the new position of the mask, a tungsten wire coated with bismuth introduced, and the wire heated after the vacuum has been re-established. In this way a deposit B of bismuth is produced on the other half of the sheet, the two deposits overlapping at the narrow rectangular central zone C, which is preferably about 1-2 mm. in width.

As an alternative to employing heater wires for volatilizing the materials constituting the elements of the thermocouple, these materials may be contained in refractory crucibles which are either heated internally or by externally applied eddy current heating.

After removal from the vacuum chamber, the sheet is cut, when separate individual thermocouples are required (Fig. 1), into thin slices 11 extending transversely to the overlap zone. It will be understood, however, that the cuts in the sheet need not necessarily be made at right angles to the overlap zone. They may be at any convenient angle, and need not be parallel or straight edged cuts. In some cases it may be convenient to cut in such a way that the receiving junction, constituted by the overlap portion, is wider than the rest of the strip. Each slice is then picked up mechanically on to a pair of wires 12 (Fig. 4) projecting from a pinch 13 which is subsequently sealed into a vessel which is evacuated, the ends of the strip being afterwards clipped to the wires, as hereinafter described. By the expression "pinch" we mean the illustrated tubular glass body 13, which is closed and reduced in size, as shown, at its upper end and supports the wires 12 which, when the pinch is sealed into a vessel to be consequently evacuated, serve as electrical connections from the thermocouple to the exterior of the vessel. It is preferred to use wires which are massive in comparison with the deposits to assist in keeping the cold junctions cool. If desired a metal such as silver, gold or copper can be evaporated on to the portions of the sheet at which the cold junctions will occur to assist in making good electrical and thermal connections at these points. Such deposits are indicated at D in Fig. 11. The wires 12 may conveniently be of copper or nickel.

In the case where it is desired to produce a number of thermocouples connected in parallel, instead of cutting the sheet 10 into separate strips 11, a zig-zag D is cut from it (Fig. 2). This consists of a number of individual thermocouples united at their ends, and will be clipped (see Fig. 16) at each joint between the strips and at the ends of the zig-zag to supporting wires 60 by means of clips in the manner already described, the group of supporting wires 60 at each side of the zig-zag being joined to a common lead wire 12.

To produce a number of thermocouples connected in series, the mask employed during the vaporisation of the antimony and bismuth will be such that each deposit consists of a series of staggered parallel inwardly extending strips located alternately at opposite sides of the sheet, the two deposits being out of register so that they overlap only at the centre of the sheet as shown in Fig. 3, C as before indicating the narrow central zone of overlap. The sheet is then cut to form a zig-bag D, which is clipped (see Fig. 17) at the junctions between the individual strips to supporting wires 60' as already described, these wires serving to keep the cold junctions cool but not acting as lead wires. The ends of the zig-zag are clipped to the lead wires 12.

When antimony and bismuth are used as the elements of the thermocouple, it is found that under suitable conditions, the bismuth will form a black coating at the hot junctions, which serves as a target or receiver for the radiation. If desired, however, a further deposit may be formed at the hot junctions, e. g., a deposit of bismuth black, antimony black, platinum black or other black material appropriate to the wave length of the radiation to be received. The term "black" refers, of course, to materials which are black to infra red radiation, and the materials in question need not necessarily be black to radiation in the visible spectrum.

As shown in Fig. 4, each end of the thermocouple is clipped to the wire by a pressure pad constituted by a bracket 14 of metal foil, e. g., molybdenum or nickel, welded to the wire 12. After picking up the thermocouple strip 11, the brackets are closed down over it, as shown in Fig. 5, to clip the thermocouple to the wires.

If desired, with a view to improving the electrical and thermal connections established by the pressure pads, spring clips 15 may be fitted over the pressure pads after they have been closed down over the thermocouple, as shown in Fig. 6.

Fig. 7 shows an arrangement similar to Fig. 5, except that in this case two thermocouples are independently mounted side by side on the same pinch, with their hot junctions both exposed to the incident radiation.

The device shown in Fig. 8 incorporates a mask 18 having a central aperture 19 opposite the hot junction of the thermocouple. The mask 18 is supported by a wire 20 sealed into the pinch, and serves to confine the radiation to the hot junction and prevent marginal rays from impinging on the cold junctions. Where desired, the wire 20 supporting the mask can be led out of the vessel into which the pinch is sealed, and earthed or connected to a source of desired constant potential.

Preferably, as shown in Fig. 8A, the pinch is sealed into a glass vessel 50, to be subsequently evacuated, having a window 51 of material transparent to infra red radiation of the kind described in our copending application Serial No. 494,576. If desired, instead of providing a mask on the pinch, the thermocouple can, in this case, be mounted close up to the window, and a mask 52 can be painted or otherwise formed on the outer surface of the window.

Figs. 9 and 10 show an alternative form of connection between the thermocouple and its supporting wires. In this case the wire has welded to it a strip 21 of nickel. To this strip is welded a pressure pad constituted by a platinum bracket 14, which is initially open as shown in Fig. 9. To the nickel strip 21 is welded, at 22, a strip 23 of spring steel. After the thermocouple strip has been picked up, the spring steel strip 23 is bent over and its free end is welded to the nickel strip at 24 (Fig. 12) thus closing the bracket 14 down on the thermocouple and pressing it firmly against it to establish the required electrical and thermal connection.

Figure 11:
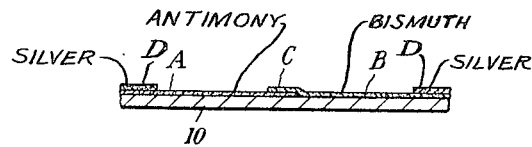
Figure 12:
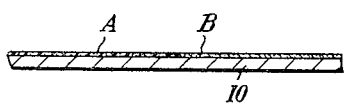
Figure 13:
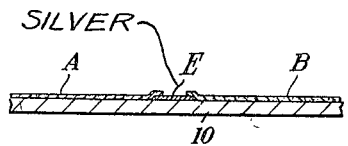
Figure 14:
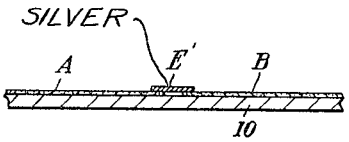
Figure 15:
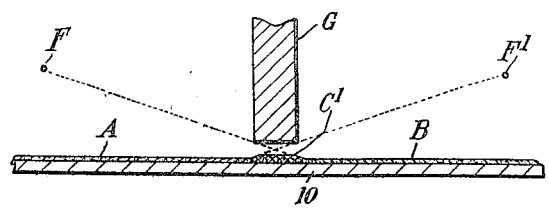

In each of Figs. 11-14 the deposits A and B are made in succession, and in Fig. 11 there is an overlap C of the character already described. The deposits may, however, be arranged to form a butt connection as shown in Fig. 12. Again the deposits A, B may be slightly spaced and bridged by a deposit E of a third material, e. g., silver applied to the sheet before the main deposits (Fig. 13) or by a deposit E' of the third material applied to the sheets after (Fig. 14) the main deposits. An overlap connection between the two deposits may also be produced by depositing them simultaneously by evaporation from two sources F, F¹ (Fig. 15) using a mask G such that in the zone C¹ the deposits will, as it were, be interleaved to produce the required hot junction.

What we claim as our invention and desire to secure by Letters Patent is:

1. The combination, with a pair of spaced conducting wires, of a thermocouple supported thereon, said thermocouple comprising a narrow strip of thin sheet material of low thermal and electrical conductivity, one surface of which is supported by the wires and the other surface of which carries deposits of the materials constituting the elements of the thermocouple, said deposits contacting centrally of the strip to form a sensitive junction, and clips connecting the thermocouple to the wires and establishing thermal and electrical contact between the deposits and the wires.

2. The combination, with a pair of spaced conducting wires, of a thermocouple supported thereon, said thermocouple comprising a narrow strip of thin sheet material of low thermal and electrical conductivity, one surface of which is supported by the wires and the other surfaces of which carries deposits of the materials constituting the elements of the thermocouple, said deposits contacting centrally of the strip to form a sensitive junction, and a metallic pressure pad welded to each wire and bent over in U-formation to embrace the end of the strip and secure it to the wire, one limb of the pad supporting the uncoated surface of the strip and the other pressing against the deposit on the other surface of the strip.

3. A combination as claimed in claim 2, having a spring clip fitted over each pressure pad.

4. A thermocouple assemblage for sealing into an evacuable vessel to produce a static vacuum thermocouple, said assemblage comprising a pinch, a pair of spaced conducting wires sealed into and extending through the wall of the pinch, a narrow strip of thin sheet material of low thermal and electrical conductivity having on one surface deposits of the materials constituting the elements of the thermocouple, which deposits are in contact centrally of the strip to form a sensitive junction, and clips supporting said strip on said wires, with its uncoated surface nearest the wires, said clips establishing thermal and electrical contact between the deposits and the wires.

ARNOLD GRAVES.
GILBERT ARTHUR RICHARD TOMES.